United States Patent [19]

Juhasz et al.

[11] Patent Number: 5,978,405
[45] Date of Patent: Nov. 2, 1999

[54] LASER CHAMBER WITH MINIMIZED ACOUSTIC AND SHOCK WAVE DISTURBANCES

[75] Inventors: Tibor Juhasz, Irvine; Richard C. Ujazdowski; Herve A. Besaucele, both of San Diego; Robert G. Ozarski, Poway; James H. Azzola, San Diego, all of Calif.

[73] Assignee: Cymer, Inc., San Diego, Calif.

[21] Appl. No.: 09/036,158

[22] Filed: Mar. 6, 1998

[51] Int. Cl.⁶ ...................................................... H01S 3/22
[52] U.S. Cl. ................................ 372/57; 372/55; 372/102
[58] Field of Search ................................. 372/55, 57, 58, 372/65, 86, 87, 11, 102

[56] References Cited

U.S. PATENT DOCUMENTS

| | | | |
|---|---|---|---|
| 3,611,181 | 10/1971 | Lary et al. | 372/102 X |
| 4,126,832 | 11/1978 | Schlossberg et al. | 372/102 X |
| 4,328,468 | 5/1982 | Krawczak et al. | 372/97 |
| 4,959,840 | 9/1990 | Akins et al. | 372/57 |

OTHER PUBLICATIONS

Forestier, B. M., Sentis, M. L., Fournier, S.M., and Fontaine, B.L. "Flow and acoustics in a closed–loop high pulse rate frequency XeCl laser", . . . Symposium Oxford, Aug. 20–24, 1984, pp. 277–282.

Bessafi, M., Canarell, P., Fontaine, B. L., Forestier, B. M., Delaporte, Ph. C., and Sentis, M. L. "Limitations of a High Average Power Excimer Laser By Acoustic Or Shock Waves", American Institute of Physics, 1990, pp. 665–670.

Canarelli, Patrick, Sentis, Marc L., Delaporte, Philippe Ch., Fontaine, Bernard L. and Forestier, Bernard M., "Acoustic waves damping experimental study in X–ray preionized high repetition XeCl", SPIE, vol. 1278 Excimer Lasers and Applications (1990), pp. 77–87.

Truong, J. P., Sentis, M. L., Delaporte, P., Forestier, B., Fontaine B., Uteza, O. and Tassy Y., "Efficient acoustic wave damping in a high pulse repetition rate XeCl Laser", SPIE, vol. 1810, 1992.

Goto, T., "Key Technologies for 5 kHz, 500 W XeCl excimer laser", 23rd Workshop of the Int. School of Quantum Electron., Dec. 1, 1997 (Toshiba Corp.).

*Primary Examiner*—Brian Healy
*Attorney, Agent, or Firm*—Michael J. Halbert

[57] ABSTRACT

A laser chamber has angled reflectors that reflect acoustic and shock waves away from the laser discharge area to minimize acoustic and shock wave disturbances. The angled reflector may have different configurations to assist in the dissipation of the acoustic and shock waves. For example, the angled reflector may have a modulated reflective surface, such as having grooves or holes defined within the surface. Further, the angled reflector may have a reflective surface with acoustic and shock wave absorbing properties. The reflective surface with absorbent properties may be a felt metal or have multiple layered porous surfaces. In addition, the walls of the laser chamber may be modulated to assist in the dissipation of the acoustic waves and shock waves through absorption, scattering, and by generating interference within the reflected waves. Multiple layered porous surfaces may be used along the walls to absorb and scatter incident waves. The walls of the laser chamber may also be covered with an acoustic and shock wave absorbing material, such as felt metal. In other embodiments, the walls of the laser chamber are modulated with grooves, such as triangular or rectangular horizontal grooves, which scatter incident waves and generate interference within reflected waves.

23 Claims, 6 Drawing Sheets

FIG.11

LASER CHAMBER WITH MINIMIZED ACOUSTIC AND SHOCK WAVE DISTURBANCES

FIELD OF THE INVENTION

The present invention relates to a laser discharge chamber and in particular to a laser discharge chamber that minimizes acoustic or shock wave disturbances.

BACKGROUND

Figure 1:
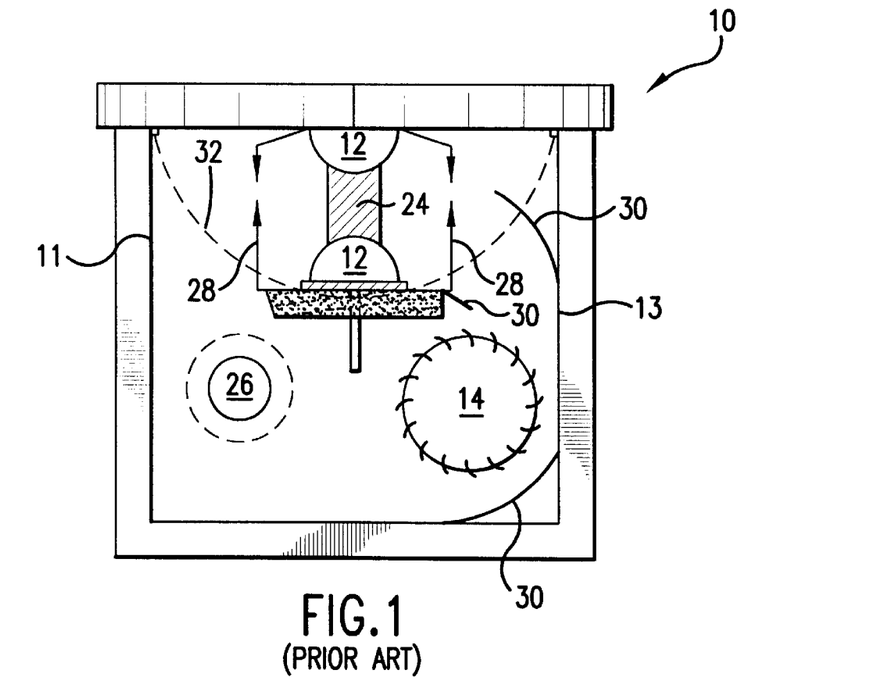
FIG. 1 is a front view of a conventional laser chamber used in a pulsed laser system.

Pulsed laser systems, such as excimer lasers, are well known. FIG. 1 is a front view of laser chamber 10 used in a conventional pulsed laser system. As shown in FIG. 1, laser chamber 10 includes an electrode structure 12, a blower 14, a heat exchanger 26, a pre-ionizer 28, baffles 30 and a grounding screen 32, which is used to connect the lower of electrodes 12 to ground. A laser discharge area 24 is defined by electrode structure 12.

Figure 2:
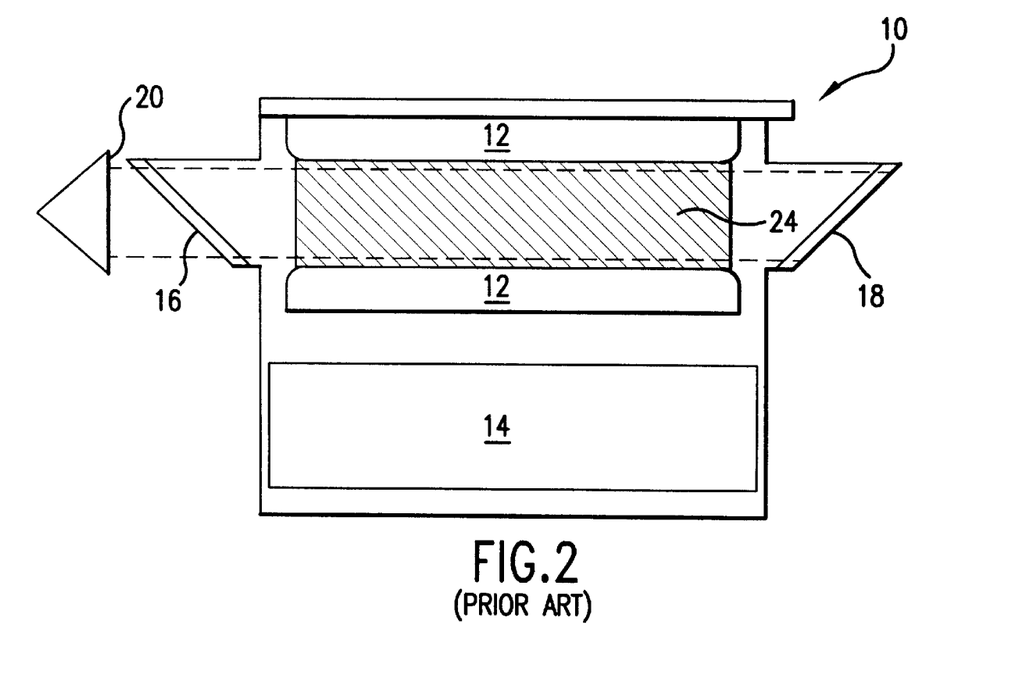
FIG. 2 is a side view of a conventional laser chamber used in a pulsed laser system.

FIG. 2 is a side view of laser chamber 10. Laser chamber 10, as shown in FIG. 2, also includes windows 16, 18, and a laser beam 20.

As well known by those skilled in the art, a pulsed laser system, such as an excimer laser, produces high energy, high frequency pulses in a gas that is between electrodes 12 in laser chamber 10. The gas, which may contain krypton and fluorine, is maintained at high pressure, for example, 3 atm. Pre-ionizer 28 first floods the gas within discharge area 24 with free electrons ($10^6$ to $10^8$ per $cm^3$). Once the gas within discharge area 24 is conditioned with a sufficiently increased electron density, electrodes 12 produce a high energy discharge, which may be for example 15–50 kV. The lasing action from the high energy discharge occurs within 100 nsec from the time of discharge.

The high energy discharge in discharge area 24 produces a large amount of local heating in the gas. The thermal disturbance changes the index of refraction of the gas, which has a deleterious effect on the efficiency and energy of the laser system. The thermal disturbance in the gas does not affect the lasing action from the pulse that caused the thermal disturbance because the lasing action occurs within a short amount of time after the high energy discharge, approximately 100 nsec. However, subsequent high energy discharges, which occur at a frequency of approximately 1 to 2 KHz, will be produced in the highly disturbed, thermally energetic gas unless the gas is circulated within laser chamber 10. Thus, blower 14 is used to circulate the gas within laser chamber 10, while heat exchanger 26 is placed in the path of the gas flow to cool the gas as it circulates. Typically, the gas in laser chamber 10 is circulated with a flow velocity of 25–30 meters per second, however this amount is dictated by the frequency of the pulsed laser system.

When electrode structure 12 produces a high energy discharge an acoustic and/or shock wave is produced which then propagates outward from discharge area 24. An acoustic wave is a standing wave that is formed within the cavity of laser chamber 10 and that travels with the velocity of sound. Shock waves, on the other hand, are free standing waves that generate high pressure gradients and that travel at velocities greater than the velocity of sound.

The acoustic and shock waves propagate through the gas until they reach the walls 11 and 13 of laser chamber 10, at which time the acoustic and shock waves are reflected back into discharge area 24. The acoustic and shock waves are unwanted pressure changes in the gas that, when reflected back into discharge area 24, interfere with the energy efficiency and energy stability of the laser system. The degree to which the energy efficiency and energy stability are affected depends on pulse repetition frequency as these frequencies interact with the natural acoustic modes of the chamber.

SUMMARY

A laser chamber in accordance with one embodiment of the present invention has angled reflectors along the sides of the laser discharge area to reflect acoustic waves and shock waves away from the laser discharge area. Thus, the acoustic and shock waves that emanate from the discharge area are permitted to dissipate within the laser chamber without being reflected directly back into the laser discharge area. Further, the angled reflectors may assist in directing the flow of the circulating gas within the laser chamber.

The angled reflectors may have different configurations to assist in dissipating the acoustic and shock waves. The angled reflectors may have grooves and holes defined in the reflective surface, which scatter the incident waves as well as generate interference within the waves. The angled reflectors may also be covered with an acoustic and shock wave absorbing material, such as felt metal. Moreover, angled reflectors may have porous layers which absorb incident acoustic and shock waves. For example, a layered baffle stack of multiple perforated plates may be used as layered angled reflectors. The porous layers of the layered angled reflectors that are closest to the laser discharge area should have a greater porosity than the porous layers further from the laser discharge area.

In addition, the walls of the laser chamber may be modulated to assist in the dissipation of the acoustic and shock waves through absorption, scattering, and by generating interference within the reflected waves. For example, the layered baffle stack may be used along the walls of the laser chamber to absorb and scatter incident waves. The walls of the laser chamber may also be covered with an acoustic and shock wave absorbing material, such as felt metal. In other embodiments, the walls of the laser chamber may have grooves, such as triangular or rectangular grooves, which scatter incident waves and generate interference within the waves.

BRIEF DESCRIPTION OF THE DRAWINGS

The above and other features, aspects, and advantages of the present invention will become better understood with regard to the following description, appended claims, and accompanying figures, where:

DETAILED DESCRIPTION

Figure 3:
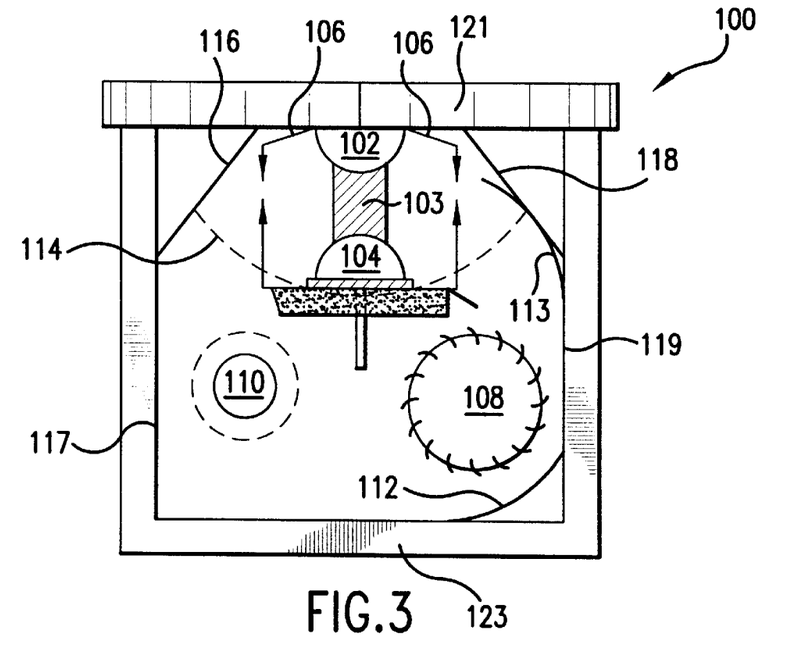
FIG. 3 is a front view of a laser chamber using angled reflectors to provide acoustic and shock wave dissipating properties.

FIG. 3 is a front view of a laser chamber 100 with angled reflectors 116 and 118 to minimize acoustic and shock wave disturbances in accordance with one embodiment of the present invention. Laser chamber 100 includes an electrode structure with a cathode 102 and anode 104, which define discharge area 103, and a pre-ionizer 106. Laser chamber 100 also includes a blower 108, a heat exchanger 110, baffle 112 and 113, and a current screen 114.

Laser chamber 100, as shown in FIG. 3, is similar to Excimer Laser Model 5000, produced by CYMER, Inc. in San Diego, Calif., however, laser chamber 100 includes two angled reflectors 116 and 118 that are positioned on each side of discharge area 103. The embodiments of the present invention, however, are not limited to use with the specific laser chamber shown, but may be used in laser chambers having different configurations.

Figure 4:
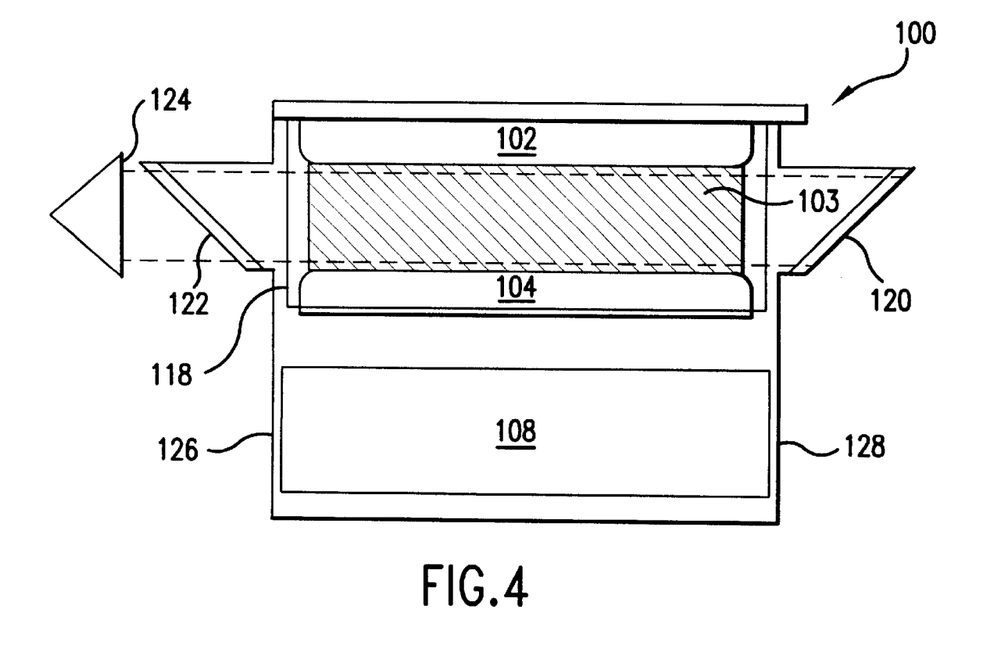
FIG. 4 shows a side view of the laser chamber shown in FIG. 3.

FIG. 4 shows a side view of laser chamber 100. Also shown in FIG. 4 are the rear window 120, front window 122, and laser 124. FIG. 4 shows angled reflector 118 positioned along the length of discharge area 103. Angled reflector 116 (not shown in FIG. 4) is likewise positioned along the opposite side of discharge area 103. As shown in FIG. 4, the length of angled reflector 118 is less than the length of discharge chamber 100, however, if desired angled reflector 118, as well as angled reflector 116, may abut the front wall 126 and rear wall 128 of laser chamber 100. It will be understood by those of ordinary skill in the art, however, that angled reflectors 116 and 118 should be positioned along the entire length of discharge area 103 for optimal performance.

Angled reflectors 116 and 118 as shown in FIG. 3 are positioned abutting the top wall 121 of laser chamber 100 along each side of discharge area 103 and are angled toward the bottom wall 123 of laser chamber 100. Angled reflectors 116 and 118 may be manufactured from aluminum, ceramic, or other rigid type material that are either compatible with the specific gases used in laser chamber 100 or plated with a compatible material, such as nickel. Angled reflectors 116 and 118 may be integrally formed with walls 117 and 119, respectively, of laser chamber 100, or may be installed in laser chamber 100 after production.

As cathode 102 and anode 104 generate high energy discharges acoustic and shock waves are generated in the gas in laser chamber 100. The acoustic and shock waves propagate outward until they reach angled reflectors 116 and 118. Because angled reflectors 116 and 118 are angled toward the bottom portion of laser chamber 100, the acoustic and shock waves generated by the high energy discharge are reflected away from discharge area 103 and towards the bottom portion of laser chamber 100. Consequently, the acoustic and shock waves are not reflected directly back into discharge area 103, but are reflected downward into the laser chamber 100 where the waves substantially dissipate. Thus, the acoustic and shock waves are reflected away from discharge area 103 thereby minimizing the disturbances caused by the waves.

It should be understood that angled reflectors 116 and 118 should be positioned relative to discharge area 103 to reflect the acoustic and shock waves away from discharge area 103. The reflective surface of angled reflectors 116 and 118 may be planar, curved, or modulated to scatter reflected waves. The particular angle of angled reflectors 116 and 118 depends on the configuration of the laser chamber but should be adjusted to minimize the acoustic or shock waves that are reflected back to discharge area 103. A typical angular range is 30–45° with vertical walls 117 & 119.

Angled reflectors 116 and 118 have the additional advantage of acting as flow guides for the gas circulating within laser chamber 100. Thus, angled reflectors 116 and 118, which are shown in FIG. 3 as abutting the top wall 121, prevent disturbance in the flow of the gas. Although baffle 113 is also shown in FIG. 3, in some embodiments baffle 113 may be removed because angled reflector 118 will adequately guide the flow of gas.

In addition, angled reflectors 116 and 118 may have different types of reflective surfaces. For example, angled reflectors 116 and 118 may have flat surfaces, as shown in FIG. 3, which will efficiently reflect the acoustic and shock waves away from discharge area 103 and will generate little disturbance to the gas circulating within laser chamber 100. The surfaces of angled reflectors 116 and 118 may also be lined with an acoustic and shock wave absorbent material such as felt metal. Angled reflectors 116 and 118 lined with felt metal will partially absorb the acoustic and shock waves and will reflect the remaining waves away from discharge area 103.

Figure 5A:
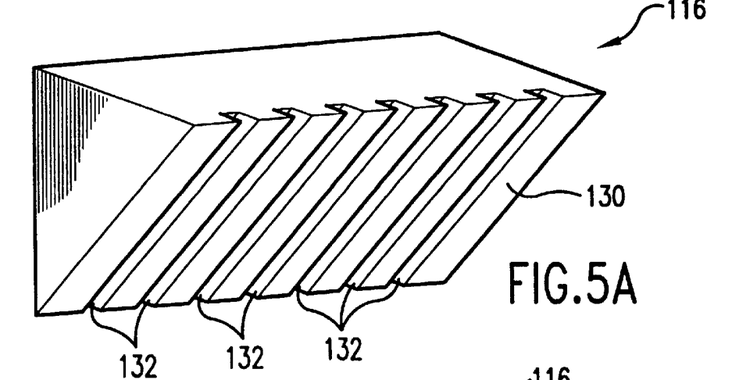
FIGS. 5A, 5B and 5C show particular embodiments of a modulated reflective surface of an angled reflector.
Figure 5B:
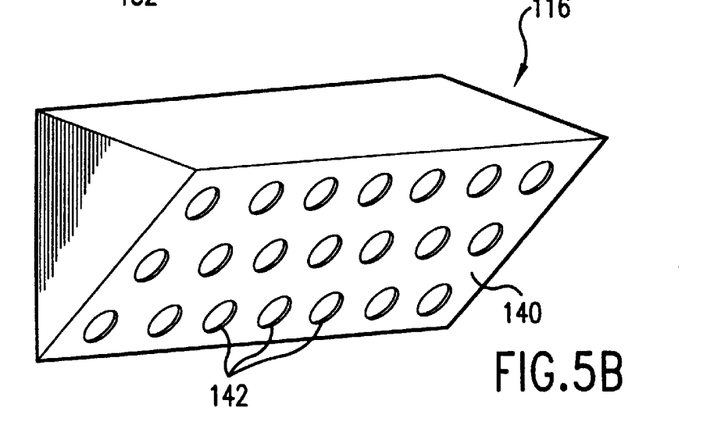
Figure 5C:
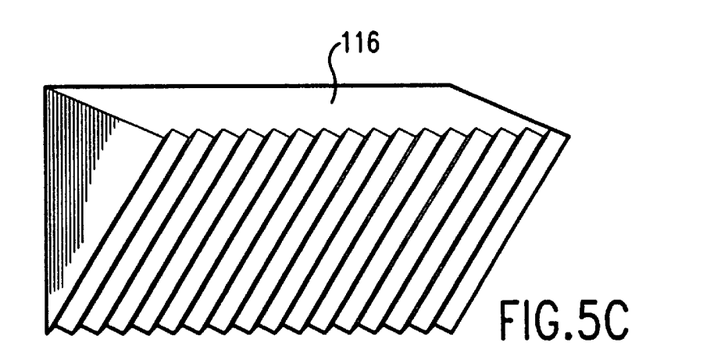

Moreover, the surfaces of angled reflectors 116 and 118 may be modulated with grooves. FIGS. 5A, 5B and 5C show perspective views of angled reflector 116 with a modulated surface. It is understood that only angled reflector 116 is shown in FIGS. 5A, 5B and 5C for ease of reference, and that angled reflector 118 may have a similar configuration. As shown in FIG. 5A, the reflective surface 130 of angled reflector 116 is modulated with vertical grooves 132. Angled reflector 116, as shown in FIG. 5A, reflects the acoustic and shock waves away from discharge area 103. In addition, grooves 132 in the reflective surface 130 of angled reflector 116 scatter incident acoustic and shock waves as well as generate interference in the reflected waves. Consequently, reflective surface 130 will not only reflect acoustic and shock waves away from discharge area 103, but grooves 132 will assist in breaking up and dissipating the acoustic and shock waves.

Grooves 132 are spaced approximately 0.3 inch apart and are 0.1 inches wide and 0.1 inch deep. Of course other configurations are possible, including changing the width, depth, or closeness of grooves 132. Further grooves 132 may have different configurations, including triangular or sinusoidal. If desired, grooves 132 may be configured horizontally across reflective surface 130 of angled reflector 116. However, horizontal grooves may disturb the circulating gas flowing over reflective surface 130 more than vertical grooves 132.

FIG. 5B shows a perspective view of angled reflector 116 with a modulated reflective surface 140. Modulated reflective surface 140 contains holes 142, which act similar to grooves 132 shown in FIG. 5A. Holes 142 scatter acoustic waves and shock waves as well as creating interference in the waves, while reflective surface 140 of angled reflector 116 reflects the waves away from discharge area 103. Holes 142 may be approximately 0.1 inch in diameter and 0.1 inch deep and positioned approximately 0.3 inch apart.

FIG. 5C shows a sawtooth modulated surface which converts each shock wave into a large number of individual wavelets scattering in numerous directions.

Figure 5D:
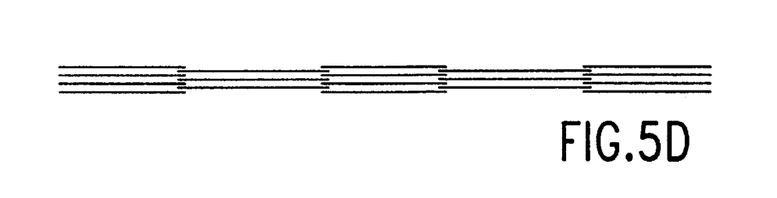
FIG. 5D shows a technique for constructing a baffle from thin plates.

FIG. 5D shows a method of constructing a baffle by stacking plates, one on top another, with their edge presented to the shock wave to be attenuated.

Figure 6:
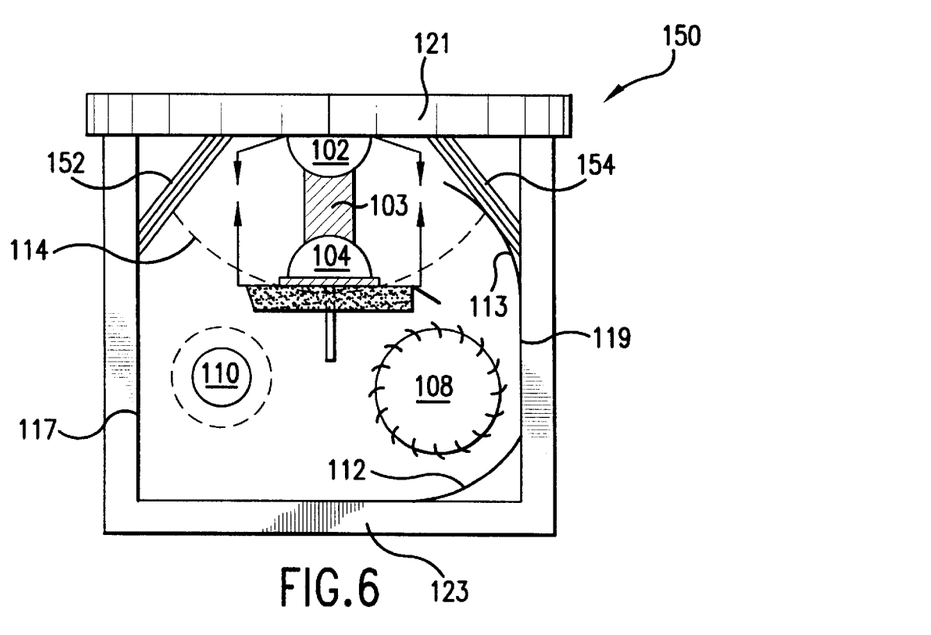
FIG. 6 shows a front view of a laser chamber with layered angled reflectors.

FIG. 6 shows a front view of laser chamber 150 with layered angled reflectors 152 and 154 positioned along discharge area 103 such that acoustic waves and shock waves are reflected away from discharge area 103. Laser chamber 150 is similar to laser chamber 100 shown in FIG. 3, like designated elements being the same. However, laser chamber 150 includes layered angled reflectors 152 and 154. Layered angled reflectors 152 and 154 may for example contain multiple layers of perforated plates or layers of wire mesh. Although FIG. 6 shows four layers, it should be understood that any desired number of layers may be used.

Figure 7:
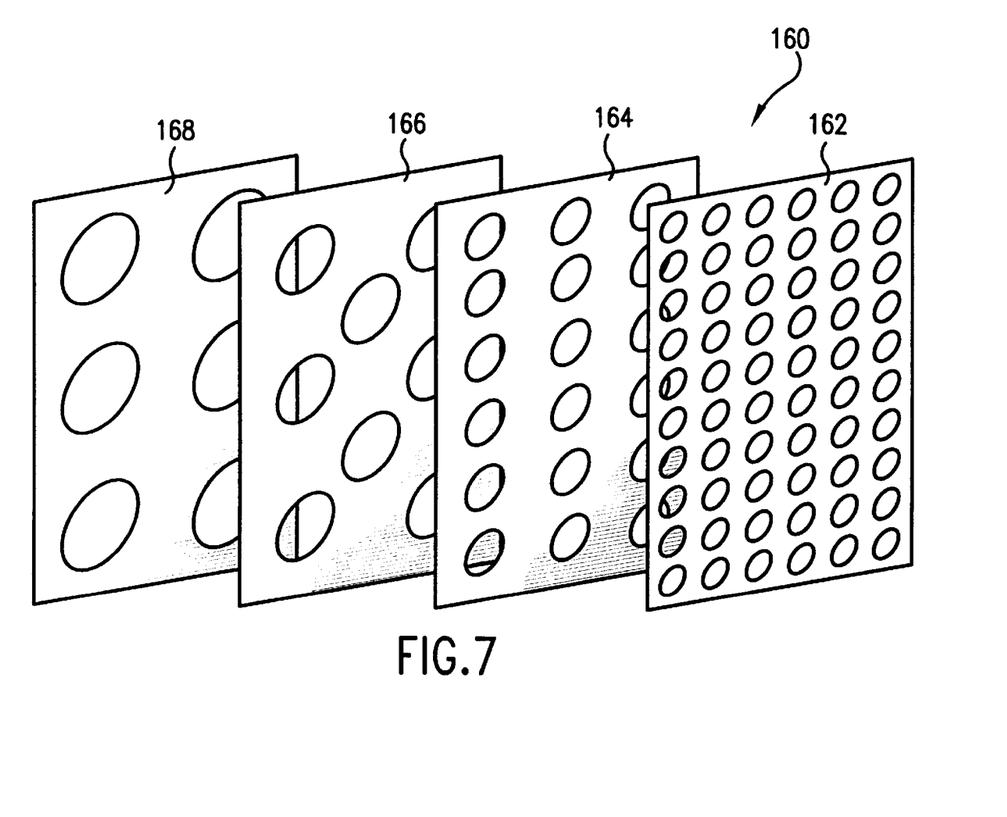
FIG. 7 shows a layered baffle stack, which may be used as one embodiment of layered angled reflectors shown in FIG. 6 or as the walls of the laser chamber as shown in FIG. 8.

FIG. 7 shows a layered baffle stack 160, which may be used as one embodiment of layered angled reflectors 152 and 154. Layered baffle stack 160 is shown in FIG. 7 as containing portions of four plates 162, 164, 166, and 168. It will be understood that layered baffle stack 160 is not limited to four plates, but may have any desired number of plates. The plates of layered baffle stack 160 may be manufactured from aluminum, ceramic, or other similarly rigid material having holes to produce the desired porosity, or from mesh of similar material.

The four plates 162, 164, 166, and 168 decrease in porosity from the outside plate 162 to the inside plate 168 and each plate may be positioned approximately 0.1 inch away from the next plate, although the proximity of plates may be varied to adjust the absorption efficiency of the layered baffle stack 160. Thus, the outside plate 162, which is the closest plate to discharge area 103, may have a porosity of approximately 0.9, or ninety percent, while plates 164, 166, and 168 have respective porosities of approximately 0.7, 0.5, and 0.3. Of course the porosities of plates 162, 164, 166, and 168 may be varied, for example to control absorption of the acoustic and shock waves as opposed to reflection of the waves, and in one embodiment plates 162, 164, 166, and 168 may have the same porosities, or vary inversely from low to high porosity.

The acoustic and shock waves that come in contact with layered baffle stack 160 are partially absorbed and partially reflected. Because the highly porous plate 162 is on the outside of layered baffle stack 160, the majority of the acoustic and shock waves are transmitted by plate 162. As the porosity of the plates decreases, more reflection and less transmission of the acoustic and shock waves occurs. The acoustic waves and shock waves that are transmitted into layered baffle stack 160 are reflected multiple times by the plates within layered baffle stack 160. Consequently, the acoustic waves and shock waves are substantially dissipated within layered baffle stack 160, although there may be some waves that are reflected out of layered baffle stack 160.

Where layered angled reflectors 152 and 154, shown in FIG. 6 use the configuration of layered baffle stack 160 shown in FIG. 7, the plates of layered angled reflectors 152 and 154 are stacked such that the outside plate, i.e., the plate closest to discharge area 103, has the highest porosity of the layers, with each successive layer toward wall 117 or 119 of laser chamber 150 having a decreased porosity. Thus, layered angled reflectors 152 and 154 will partially absorb and dissipate the acoustic and shock waves and will reflect the remaining waves away from discharge area 103.

Layered angled reflectors 152 and 154 may also be produced with multiple layers of wire mesh, which may also decrease in porosity from the outside layer of mesh, i.e., the layer closest to the discharge area, to the inside layer of mesh. In an alternative embodiment, the layers of wire mesh have the same porosities, or vary inversely from low to high porosity.

Figure 8:
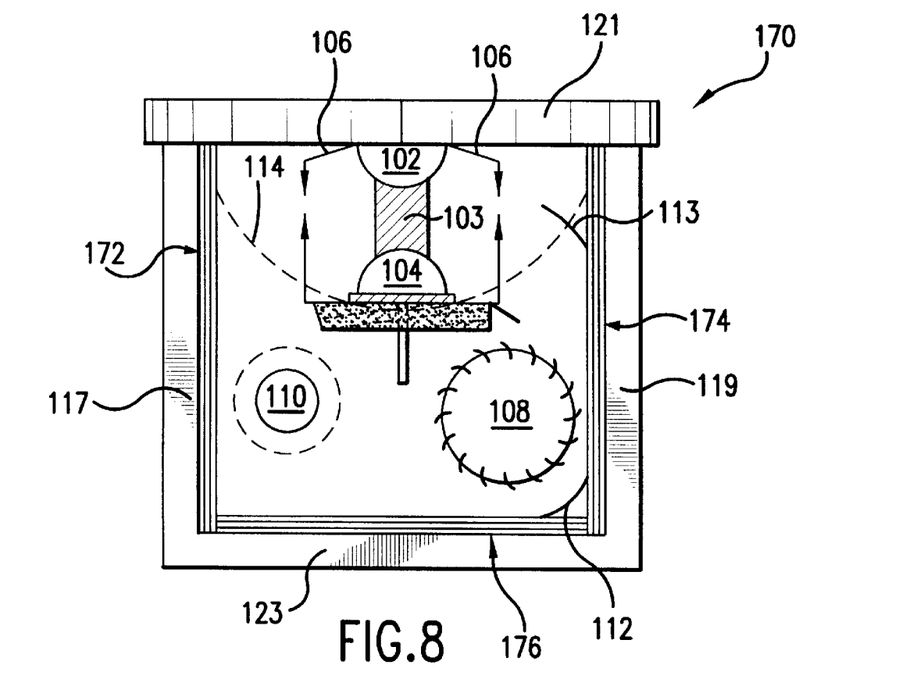
FIG. 8 shows a front view of a laser chamber having layered porous walls such as a felt metal.

FIG. 8 shows a front view of laser chamber 170 with walls 117, 119, and 123 modulated with porous layers. Layered, porous walls 172, 174, and 176 are positioned along walls 117, 119, and 123 of laser chamber 170 such that acoustic and shock waves that emanate from discharge area 103 are scattered and absorbed by porous walls 172, 174, and 176. Laser chamber 170 is similar to laser chamber 100 shown in FIG. 3, like designated elements being the same. However, laser chamber 170 does not show angled reflectors 116 and 118, but includes layered porous walls 172, 174, and 176.

Although FIG. 8 shows four layers of porous walls, it should be understood that layered porous walls 172, 174, and 176 may contain multiple layers and is not limited to a specific number. Further, laser chamber 170 may have different configurations including having a layered porous wall along the top wall 121 of laser chamber 170, or having only layered porous walls 172 and 174 along sidewalls 117 and 119, respectively, and/or having sidewalls 117 and 119 only partially covered such that only the areas of sidewalls 117 and 119 nearest discharge area 103 are covered. Moreover, it will be understood by those skilled in the art that laser chamber 170 may also include angled reflectors 116 and 118 or layered angled reflectors 152 and 154. Thus, laser chamber 170 may advantageously receive the benefits of reflecting the acoustic waves and shock waves away from discharge area 103 as well as receiving the benefit of having the acoustic waves and shock waves absorbed and scattered by layered porous walls 172, 174, and 176.

Layered porous walls 172, 174, and 176 may contain multiple layers of perforated plates such as the layered baffle stack 160 shown in FIG. 7. However, because layered porous walls 172 and 174 are not angled, undesirable back reflection of the acoustic and shock waves may occur. Thus, it is desirable for layered porous walls 172, 174, and 176 to have a high absorption efficiency and/or produce a large amount of scattering of the waves.

Additionally, layered porous walls 172, 174, and 176 may be wire mesh with each subsequent layer of mesh away from discharge area 103 having a decreasing porosity, such as that described in reference to layered angled reflectors 152, 154 shown in FIG. 6.

Figure 9:
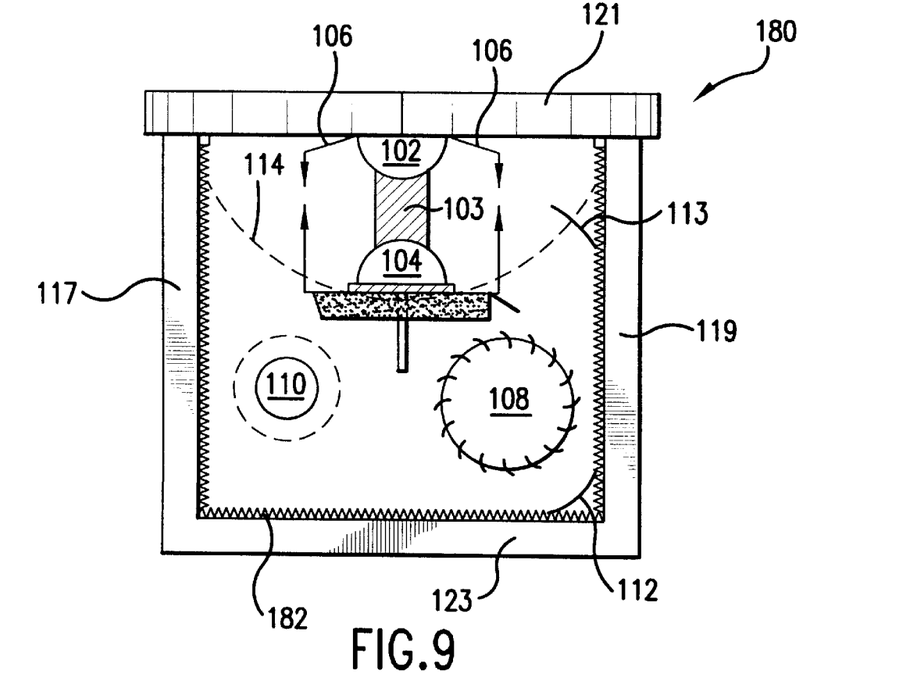
FIG. 9 shows a front view of a laser chamber with acoustic and shock wave absorbing material on the walls, such as a felt metal.

FIG. 9 shows a front view of laser chamber 180 with walls 117, 119, and 123 modulated with an acoustic and shock wave absorbing material 182. Laser chamber 180 is similar to laser chamber 170 shown in FIG. 8, like designated elements being the same. However, laser chamber 180 uses an acoustic and shock wave absorbing material to absorb and dissipate the acoustic and shock waves emanating from discharge area 103 rather than using a layered porous wall configuration. Laser chamber 180 may use, for example, felt metal or metal foam as acoustic and shock wave absorbing material 182. As with laser chamber 170, shown in FIG. 8, laser chamber 180 may use the acoustic and shock wave absorbing material 182 in conjunction with angled reflectors 116 and 118 or layered angled reflectors 152 and 154.

Figure 10:
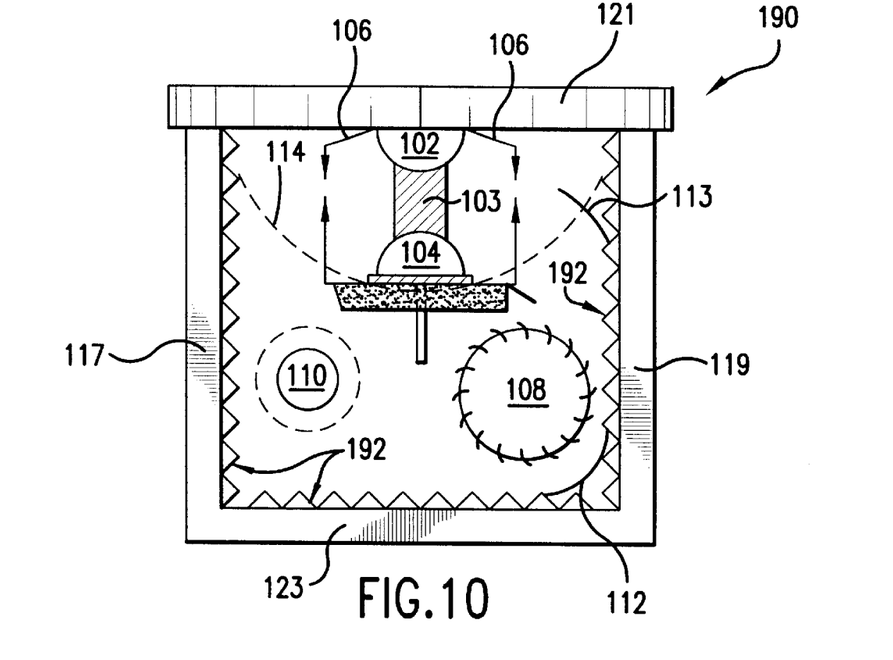
FIG. 10 shows a front view of a laser chamber having walls that are modulated with triangular horizontal grooves.
Figure 11:
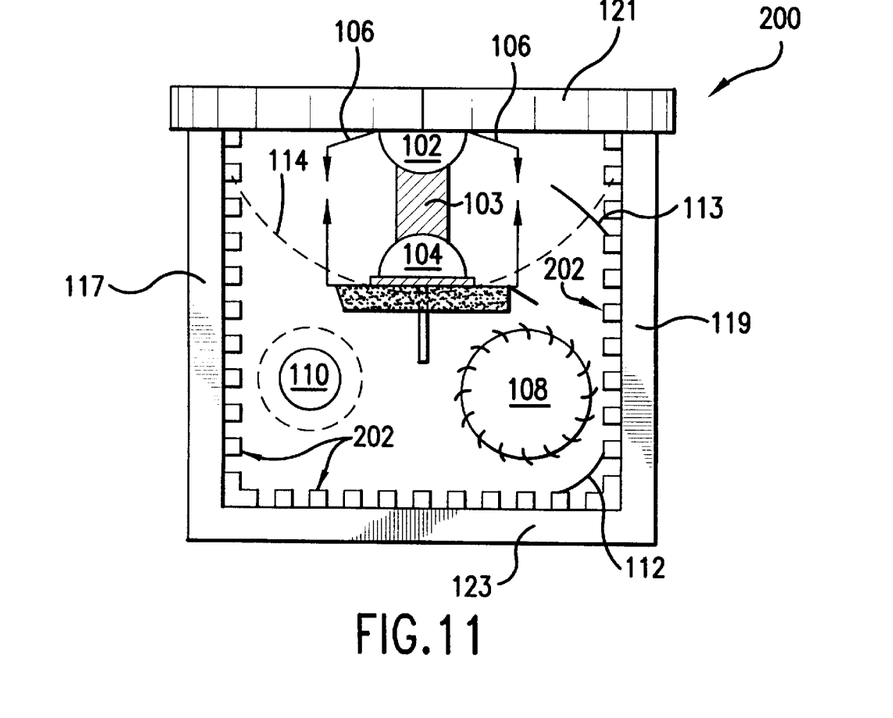
FIG. 11 shows the front view of a laser chamber having walls that are modulated with rectangular horizontal grooves.

The walls 117, 119, 121, and 123 may also be modulated as illustrated in laser chambers 190 and 200 shown in respective FIGS. 10 and 11. FIG. 10 shows a front view of laser chamber 190 with side walls 117, 119 and bottom wall 123 having triangular horizontal grooves 192. Laser chamber 190 is similar to laser chamber 170 shown in FIG. 8, like designated elements being the same. However, walls 117, 119, and 123 of laser chamber 190 are modulated with triangular horizontal grooves 192. By way of example and not limitation, the peaks of grooves 192 may be approximately 0.3 inch apart and may be approximately 0.1 inches high.

FIG. 11 shows the front view of laser chamber 200, which is similar to laser chamber 190 shown in FIG. 10, however laser chamber 200 includes modulated walls 117, 119, and 123 that have rectangular horizontal grooves 202. By way of example and not limitation, rectangular horizontal grooves 202 may be approximately 0.3 inch apart and may be approximately 0.1 inch wide and 0.1 inch deep.

Grooves 192 and 202, shown in respective FIGS. 10 and 11, scatter incident acoustic waves and shock waves as well as generate interference in the reflected waves. Thus, walls 117, 119, and 123 should have grooves 192 or 202 that run at least the length of discharge area 103 but may run from front wall 126 to rear wall 128, as shown in FIG. 4, to advantageously break up and dissipate the acoustic and shock waves.

It will be understood by those with ordinary skill in the art that grooves 192 and 202 may have different configurations. Thus, grooves 192 and 202 may have different shapes, including square, sinusoidal or sawtooth and may be positioned vertically rather than horizontally. Further, the modulated walls 117, 119, and 123 may have holes defined in the surface similar to modulated reflective surface 140 shown in Figure 5B.

Moreover, it will be understood by those skilled in the art that laser chambers 190 and 200 of FIGS. 10 and 11, respectively may also include angled reflectors 116 and 118 or layered angled reflectors 152 and 154. Thus, laser chambers 190 and 200 may advantageously receive the benefits of reflecting the acoustic waves and shock waves away from discharge area 103 through the use of angled reflectors as well as receive the benefit of having the acoustic and shock waves scattered and dissipated by modulated walls 117, 119, and 123.

Although embodiments of the present invention have been described in considerable detail with reference to certain variations thereof, other embodiments are possible. For example, embodiments of the present invention may be used in conjunction with laser chambers having configurations other than those shown. Further, it should be understood that the embodiments of the present invention may be used in conjunction with each other. Thus, for example, angled reflectors 116 and 118 or layered angled reflectors 152 and 154 may be used with grooves 192 or 202, where grooves 192 or 202 are covered with an acoustic and shock wave absorbing material 182, such as felt metal. Moreover, layered baffle stack 160 may be used where the inside plate 162 is modified to include grooves 192 or 202 to increase the scatter effect. Other combinations of the described embodiments of the present invention are possible as will be understood by those with ordinary skill in the art. Therefore, the spirit and scope of the appended claims should not be limited to the description of the versions depicted in the figures.

What is claimed is:

1. A laser apparatus comprising:
   a laser chamber;
   an electrode structure enclosed within said laser chamber, said electrode structure comprising an anode and a cathode separated by a distance defining a laser discharge area; and
   an angled reflector within said laser chamber, said angled reflector reflecting at least one of shock waves and acoustic waves emanating from said laser discharge area away from said laser discharge area.

2. The laser chamber of claim 1, wherein said angled reflector runs substantially a length of said laser discharge area.

3. The laser chamber of claim 1, wherein said angled reflector is a first angled reflector positioned at a first side of said laser discharge area, said laser chamber further comprising a second angled reflector positioned at a second side of said laser discharge area.

4. The laser chamber of claim 1, said angled reflector having a modulated reflective surface.

5. The laser chamber of claim 4, wherein said modulated reflective surface is modulated with grooves.

6. The laser chamber of claim 5, wherein said grooves of said modulated reflective surface are vertical grooves.

7. The laser chamber of claim 6, wherein said vertical grooves are triangles.

8. The laser chamber of claim 4, wherein said modulated reflective surface is modulated with holes defined in said modulated reflective surface.

9. The laser chamber of claim 1, wherein said angled reflector has a reflective surface comprising a wave absorbing material.

10. The laser chamber of claim 9, wherein said wave absorbing material is felt metal.

11. The laser chamber of claim 1, wherein said angled reflector is a layered angled reflector, said layered angled reflector comprising multiple porous reflective surfaces.

12. The laser chamber of claim 11, wherein said multiple porous reflective surfaces are multiple perforated plates.

13. The laser chamber of claim 11, wherein said multiple porous reflective surfaces are comprised of a first porous reflective surface closest to said laser discharge area, and at least one subsequent porous reflective surface, said at least one subsequent porous reflective surface having the same or different porosity than said first porous reflective surface.

14. The laser chamber of claim 11, wherein said multiple porous reflective surfaces have at least one reflective surface with a wave absorbing material.

15. A laser chamber comprising:
   an electrode structure enclosed within said laser chamber, said electrode structure comprising an anode and a cathode separated by a distance defining a laser discharge area;
   at least one wall forming a portion of said laser chamber; and
   said at least one wall having a modulated surface, said modulated surface at least partially dissipating at least one of shock waves and acoustic waves emanating from said laser discharge area.

16. The laser chamber of claim 15, wherein said modulated surface is modulated with grooves.

17. The laser chamber of claim 16, wherein said grooves of said modulated surface are horizontal grooves.

18. The laser chamber of claim 15, wherein said modulated surface comprises a wave absorbing material.

19. The laser chamber of claim 18, wherein said wave absorbing material is felt metal.

20. The laser chamber of claim 15, wherein said modulated surface is a layered modulated surface, said layered modulated surface comprising multiple porous surfaces.

21. The laser chamber of claim 20, wherein said multiple porous surfaces are multiple perforated plates.

22. The laser chamber of claim 18, said laser chamber further comprises:

an electrode structure enclosed within said laser chamber, said electrode structure comprising an anode and a cathode separated by a distance defining a laser discharge area; and wherein said multiple porous surfaces are comprised of a first porous surface closest to said laser discharge area, and at least one subsequent porous surface, said at least one subsequent porous surface having the same or different porosity than said first porous surface.

23. The laser chamber of claim 15, further comprising an angled reflector positioned at the side of said laser discharge area.

* * * * *